UNITED STATES PATENT OFFICE.

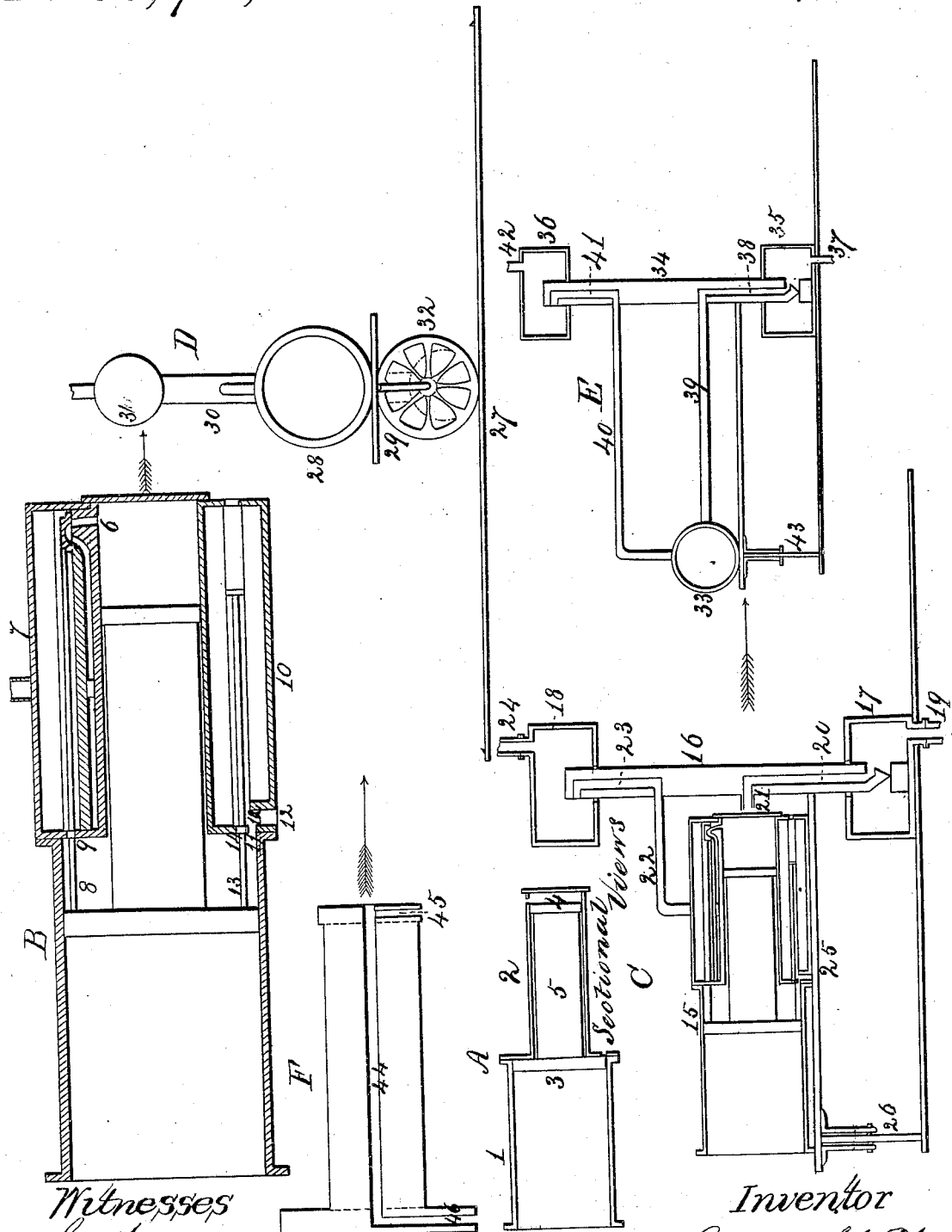

GEORGE YELLOTT, OF BALTIMORE COUNTY, MARYLAND.

IMPROVEMENT IN STEAM-ENGINES.

Specification forming part of Letters Patent No. 50,983, dated November 14, 1865.

*To all whom it may concern:*

Be it known that I, GEORGE YELLOTT, of Baltimore county, in the State of Maryland, have invented a new and useful Reaction-Engine, in which steam and other fluids are designed to be used for the purpose of propelling and steering vessels and carriages and imparting motion to stationary machinery; and I do hereby declare that the following is a full and exact description of my invention, reference being had to the accompanying drawings, making a part of this specification, and to the letters and figures of reference marked thereon.

The nature of my invention consists in so constructing a cylinder as to obtain the resistance of the atmospheric pressure and apply the reactive power created by this resistance as the motive power of the engine in propelling and steering vessels and in imparting motion to stationary machinery.

To enable others skilled in the art to make and use my invention, I will proceed to describe its construction and operation.

The accompanying Drawing A represents the cylinder without the steam-chest, valves, and other appendages, and said cylinder is so constructed that the interior diameter of one half-section of said cylinder is of larger dimension than the interior diameter of the other half-section, as seen by the drawing. Figure 1 represents the aforesaid section of the cylinder which is of larger diameter and which is open at the end, as represented in the drawing. Fig. 2 represents the aforesaid section which is of smaller diameter and which is closed at the end, as shown by the drawing. In each of these two sections of the cylinder is a piston fitting air-tight and steam-tight, as represented by Figs. 3 and 4. These pistons are connected by a piston-rod, as represented by Fig. 5, and which should be large enough to fill the space in the smaller section of the cylinder without friction, and, in order to avoid weight and unnecessary cost, should, when used in cylinders of very large dimensions, be made hollow.

The accompanying Drawing B represents the cylinder, as above described, in combination with the steam-chest, valves, and other appendages. The steam or other fluid used as a motive agent is admitted into the smaller section of the cylinder at Fig. 6 from the steam-chest Fig. 7, which, together with the valves, pipes, and other appendages for the admission and ejection of the steam or other fluid, are similar to those which have been heretofore used in other engines for the same purposes, and being well known to all persons skilled in the art of making engines, and not being claimed as part of this invention, but merely used as appendages thereto, are not accurately represented in detail in the drawing. The rod by which the steam and exhaust valves are operated is represented by Fig. 8, and is connected with the piston in the larger section of the cylinder, moving with said piston and working through a stuffing-box at Fig. 9. This rod is connected with the steam and exhaust valves, and operates said valves in precisely the same way in which they are operated in engines of ordinary construction and now in common use. Fig. 10 represents an air-pump, which is intended to pump out any particles of air which may leak into the cylinder when the engine is in operation. This air-pump is of similar construction with pumps now in use for such purposes, and is not claimed as a part of this invention, but is merely used as an appendage thereto. The air is drawn in from the cylinder at the valve represented by Fig. 11, and is expelled at the valve represented by Fig. 12. The piston-rod of the air-pump is connected with the larger piston in the cylinder, as seen by Fig. 13 in the drawing, and works through a stuffing-box at Fig. 14.

The accompanying Drawing C represents the cylinder as above described in combination with a platform, said platform being connected to and revolving with a vertical shaft, and said cylinder being placed horizontally on and firmly fixed to said platform with the closed end of the smaller section of said cylinder perpendicular to the center of motion of said vertical shaft. Fig. 15 represents the cylinder so placed. Fig. 16 is the vertical shaft, whose upper and lower extremities work steam-tight in two steam-tight boxes represented by Figs. 17 and 18. Fig. 19 is a section of the pipe which admits steam from the boiler into the box Fig. 17. Fig. 20 is a hollow space in the lower portion of said shaft to admit the passage of steam from the box Fig. 17 into the pipe Fig. 21, by which it is to be conducted by the cylinder. Fig. 22 is the pipe by which the exhaust-steam is to be conducted from the cylinder to a hollow space in the upper portion of the shaft represented by Fig. 23, and from thence into the box Fig. 18, and can then be allowed to escape by the pipe Fig. 24. Fig. 25 is a side view of the platform on which the cylinder is placed. Fig. 26 is a wheel supporting the platform at its outward edge, which wheel rests on a circular rail.

Drawing D represents a front view of the same engine when placed upon the platform, with all the appendages, precisely as described in the reference to Drawing C. Fig. 27 represents a section of the circular rail on which the above-described wheel rests. Fig. 28 represents the end of the larger section of the cylinder, which is open. Fig. 29 represents a section of the end of the platform on which the cylinder is placed. Fig. 30 is a section of the vertical shaft visible above the cylinder. Fig. 31 is the steam-tight box in which the upper extremity of the vertical shaft works, and Fig. 32 is the wheel resting on the circular rail, as described in the reference to Drawing C.

The accompanying Drawing E represents the above-described cylinder in combination with the aforesaid platform and vertical shaft, with all their appendages as above described, but so placed on said platform in a horizontal position that the closed end of the smaller section of said cylinder, instead of being perpendicular to the center of motion of said vertical shaft, is at a right angle with the radius of the circle described by said shaft in its revolution. Fig. 33 represents the end of the larger section of the cylinder when so placed. Fig. 34 represents the vertical shaft as above described. Figs. 35 and 36 represent the two steam-tight boxes in which the upper and lower extremities of said shaft work. Fig. 37 is a section of the pipe which admits the steam from the boiler into the box Fig. 35. Fig. 38 is the hollow space in the lower portion of the shaft, up which the steam passes to the pipe Fig. 39, and by said pipe is conducted to the cylinder. Fig. 40 represents the pipe by which the exhaust-steam is conducted from the cylinder and passes up the hollow space in the shaft represented by Fig. 41 into the box Fig. 36, and escapes by the pipe Fig. 42. Fig. 43 represents the wheel as already described in the reference to Drawing C.

It is intended that the cylinder shall always work horizontally, and the accompanying Drawing F represents the form of pistons intended to be used in very large cylinders when the pistons are heavy and liable to wear at their lower edges. Fig. 44 represents a hollow tube in the center of the piston-rod, which passes entirely through the smaller piston, so as to admit steam into the tube. Figs. 45 and 46 represent hollow spaces in the under portions of the two pistons, connected with or being prolongations of the hollow tube in the piston-rod. Steam enters the hollow tube in the piston-rod and fills the hollow spaces in the pistons. The lower ends of the hollow spaces in the pistons are open, so that the steam presses on the cylinder as the pistons slide along. The upper ends of the said hollow spaces in the pistons are closed. As a consequence each piston is pressed upward by the steam, the upward pressure not being balanced by a corresponding pressure below. Now, if the weight of a piston is thirty pounds and the pressure of the steam is thirty pounds to the square inch, and the hollow space in the piston, as above described, is one inch in diameter, the weight of the piston is just balanced by the upward pressure.

Having described the construction of my engine, with its various combinations, I will now proceed to describe its mode of operation.

When the engine is to be used merely for the purpose of propelling a vessel or carriage, the cylinder, as represented in Drawing B, without the platform and vertical shaft with their appendages as above described, is placed on or within the recess of the vessel or carriage without any connection with driving-wheels, paddle-wheels, propellers, or other external machinery in contact with the road on which the carriage runs or with the water in which the vessel floats. If the vessel or carriage is intended to run in the direction of the flight of the arrow, as represented in Drawing B, the closed end of the smaller section of the cylinder is placed in that direction, the cylinder being firmly attached to the vessel or carriage in a horizontal position, with the necessary supports. Steam being admitted into the smaller section of the cylinder at Fig. 6 in Drawing B against the smaller piston, the two pistons connected by the piston-rod, as already described, are driven out against the resistance of the atmospheric pressure on the larger piston until the stroke is completed, when the steam-valve operated by the rod Fig. 8 is closed and the exhaust-valve operated by the same rod is opened, and the atmospheric pressure on the larger piston drives the two pistons back and expels the steam from the cylinder, when the exhaust-valve is closed and the steam-valve is opened by the operation of the same rod, and the two pistons are again driven out in the manner already described. As action and reaction are equal and opposite, and as the atmosphere is a body and has weight and presses with a weight of fifteen pounds on every square inch of surface, by supposing the cylinder to be of certain dimensions the reactive power and usefulness of the engine may be comprehended without difficulty. If the larger piston, as represented in Drawing B, has an area of one thousand square inches, the pressure of the atmosphere against that piston is just fifteen thousand pounds. There is at the same time an equal pressure on an equal area of the exterior surface of the closed end of the cylinder, this pressure being in a contrary direction to that against the larger piston. Steam of sufficient density being admitted into the cylinder at Fig. 6 against the smaller piston, to drive out the two pistons with a velocity of three hundred feet per minute, the larger piston moves a weight of fifteen thousand pounds with a velocity of three hundred feet a minute. The weight moved, fifteen thousand pounds, multiplied by the velocity, equals four million five hundred thousand, which, divided by thirty-three thousand, equals one hundred and thirty-six horse-power. As the proposition that action and reaction are equal and opposite is self-evident, it is equally self-evident that a reactive impulse equal to one hundred and thirty-six horse-power is exerted against the interior surface of the closed end of the cylinder—or, in other words, that if the closed end of the cylinder were a movable body, it would, when the larger piston is driven out against a resistance of fifteen thousand pounds with a velocity of three hundred feet per minute, move against a resistance of fifteen thousand pounds in a contrary direction with a velocity of three hundred feet per minute. It is, then, self-evident, that as the cylinder is firmly attached to the vessel or carriage and cannot be moved without moving the vessel or carriage with it, it would, whenever the larger piston is driven out with the aforesaid velocity, exert a reactive power of one hundred and thirty-six horse-power, which would propel the vessel or carriage in the direction of the flight of the arrow, as represented in the drawing. In this way the engine is intended to be used simply for the purpose of propulsion alone.

When the engine is employed not only to propel a vessel or carriage in a given direction, but also to steer a vessel or to back a vessel or carriage, it is used in combination with the platform and vertical shaft, with their appendages, as already described in the references to Drawings C and D. The wheel represented in those drawings as resting on the circular rail runs around on that rail, and the platform and shaft revolve in the same circle with the wheel, carrying the engine, supported by the platform, with them. The engine, with the above-described combinations, is placed near the stern or bow of the vessel. If the vessel is running in the direction of the flight of the arrow as seen in Drawing C, and the wheel and platform are moved so that the reactive power of the engine, as above described, is exerted at an angle with the line in which the vessel is running, her course will be altered. In this way the engine is used to steer a vessel, the wheel and platform being moved by levers or other suitable appliances. If the platform is turned entirely around, so that the reactive power of the engine is exerted in an opposite direction from that in which a vessel or carriage has been running, the vessel or carriage will be impelled backward. In this way the engine is used to back a vessel or carriage.

When the engine is used to impart motion to stationary machinery it is placed horizontally on the above-described platform, with the closed end of the smaller section of the cylinder at a right angle with the radius of the circle described by the vertical shaft in its revolution, as represented in Drawing E. The reactive power will then cause the shaft and platform to revolve, the wheel by which the platform is supported at its outward edge running around on the circular rail. By the proper gearing to the vertical shaft motion may be thus imparted to stationary machinery. As the reactive power is only exerted when the pistons are being driven out against the atmospheric pressure, in order to obtain a perfectly uniform motion when desired, it will be necessary to have more than one cylinder in operation at the same time, with the valves so arranged that when steam is being ejected from one cylinder it is being admitted into another.

What I claim as my invention, and desire to secure by Letters Patent, is—

1. The cylinder constructed, as above described, in two sections of unequal diameter, each section being one-half the whole length of the cylinder, with the end of the section of larger diameter open and the end of the section of smaller diameter closed, with a piston fitted air-tight and steam-tight in each section, and the two pistons connected by a piston-rod, so that when steam is admitted into the smaller section and acts against the piston in that section the other piston in the larger section may be driven out against the resistance of the atmosphere, and the reactive pressure of the steam on the closed end of the smaller section of said cylinder occasioned by said resistance may be used as the motive power of the engine, in the manner and for the purposes set forth in this specification.

2. The cylinder, as above described, in combination with and placed horizontally on the platform, supported at its outward edge by the wheel resting on the circular rail, and attached to and revolving with the vertical shaft, with the upper and lower extremities of said shaft working steam-tight in the two steam-tight boxes, and with the hollow space in the upper and lower portions of said shaft for the admission of steam from the boiler and the escape of the exhaust-steam, said cylinder being placed on said platform with the closed end of the smaller section perpendicular to the center of motion of said vertical shaft, and firmly attached to said platform, so that it can be made to revolve with it, in the manner and for the purposes set forth in this specification.

3. Said cylinder, in combination with the said platform and vertical shaft, with all their appendages, as above described, but with said cylinder placed horizontally on said platform and firmly attached thereto, with the closed end of the smaller section of said cylinder at a right angle with the radius of the circle made by said shaft in its revolution, in the manner and for the purposes set forth in the reference to Drawing E in the drawings accompanying this specification.

4. Said cylinder, in combination with the two pistons connected by the piston-rod with the hollow tube in the center of said rod extending through the smaller piston and connected with hollow spaces in the pistons, said hollow spaces in the pistons being open at the bottom and closed at the top, in the manner and for the purposes set forth in the reference to Drawing F in the drawings accompanying and making part of this specification.

GEO. YELLOTT.

Witnesses:
    RUFUS KING,
    JOHN W. IRWIN.